No. 12,088. REISSUED MAR. 3, 1903.

J. H. BULLARD.

VALVE FOR STEAM PUMPS.

APPLICATION FILED MAY 22, 1902.

Witnesses,
Everett S. Emery
Thomas B. Booth

Inventor,
James H. Bullard,
by Frank L. Emery
Atty.

UNITED STATES PATENT OFFICE.

JAMES H. BULLARD, OF SPRINGFIELD, MASSACHUSETTS, ASSIGNOR TO THE OVERMAN AUTOMOBILE COMPANY, OF CHICOPEE, MASSACHUSETTS, A CORPORATION.

VALVE FOR STEAM-PUMPS.

SPECIFICATION forming part of Reissued Letters Patent No. 12,088, dated March 3, 1903.

Original No. 674,835, dated May 21, 1901. Application for reissue filed May 22, 1902. Serial No. 108,608.

*To all whom it may concern:*

Be it known that I, JAMES H. BULLARD, a citizen of the United States, residing at Springfield, in the county of Hampden and Commonwealth of Massachusetts, have invented an Improvement in Valves for Steam-Pumps, of which the following description, in connection with the accompanying drawings, is a specification, like characters on the drawings representing like parts.

This invention relates to steam-pumps, and especially to what has become known as the "Westinghouse" pump, the object of the invention being to improve the construction of the valve mechanism thereof, whereby its action is rendered positive; and the invention runs, further, to certain novel features incidental to these improvements, all as fully described in the following specification and clearly summarized in the claims appended thereto.

Figure 1:
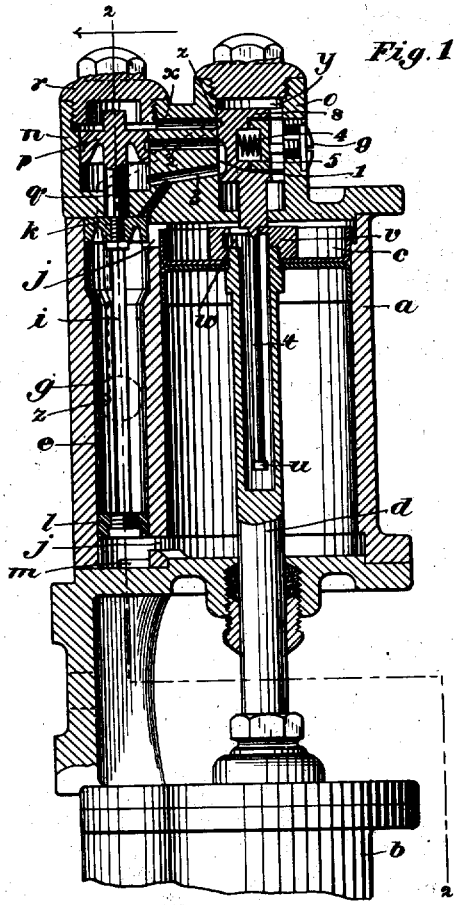
Figure 2:
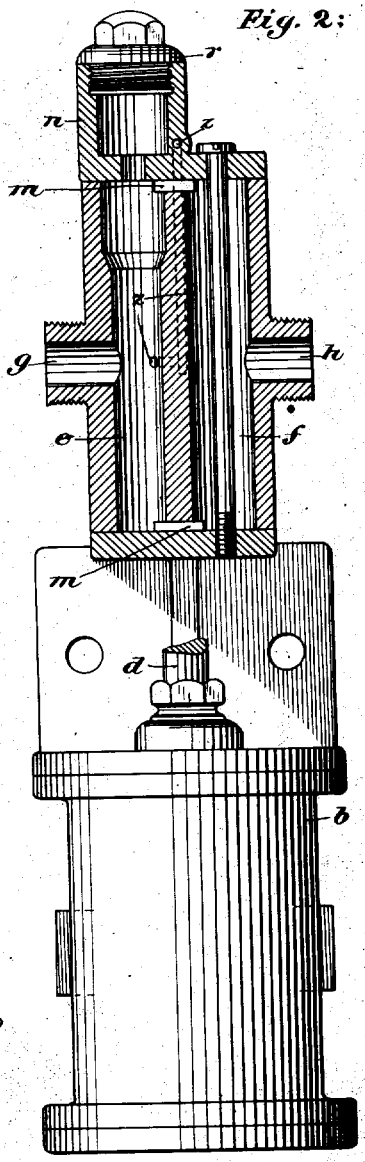
Figure 3:
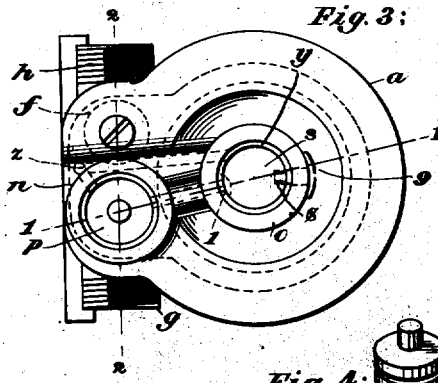
Figure 6:
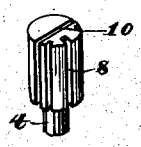
Figure 4:
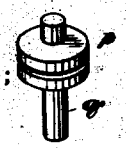
Figure 5:
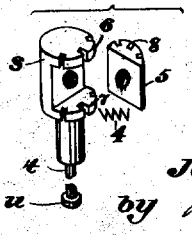

In the drawings forming part of this application, Figure 1 is a vertical section of the steam-cylinder of a pump embodying my invention. This section is taken on line 1 1, Fig. 3. Fig. 2 is a vertical section taken through the steam inlet and exhaust passages of the steam-cylinder, as indicated by line 2 2, Figs. 1 and 3. Fig. 3 is a top plan view of the steam-cylinder. Fig. 4 is a perspective view of an independent steam-valve which operates the main steam-valve in one direction. Fig. 5 is a perspective view of a piston cut-off valve, showing the parts thereof in separated relations. Fig. 6 is a perspective view of a modified construction of the valve shown in Fig. 5.

This type of steam-pump consists of a steam-cylinder *a* and a pumping-cylinder *b*, which are located end to end on a common axis and whose respective piston-heads have a common piston-rod *d*. The piston-head of the steam-cylinder *a* is indicated by *c*. These cylinders *a* and *b* are usually cast in one piece, as shown. Cast on one side of the steam-cylinder *a* are two parallel tubular passages *e* and *f*, (shown in Fig. 2,) which are also parallel with the axis of the cylinder. One of these, the passage *e*, is the steam-inlet passage, and the other, *f*, is the exhaust-passage. Said passages are entered, respectively, at *g* and *h*. Within the passage *e* is the piston-valve *i*, which is the main steam-valve, and its operation opens and closes the steam-ports *j j*, situated, respectively, at the upper and lower extremities of said passage *e*. The ends of said valve *i* are provided with heads *k* and *l*, having different diameters, the upper one, *k*, being larger than the lower one. Furthermore, in proximity to said steam-ports *j j* exhaust-ports *m m* are cut through the wall which separates the said steam inlet and exhaust passages *e* and *f*, said exhaust-ports being so located that they may be closed by the heads of the steam-valve when the latter pass by the steam-ports *j* to admit steam, which is constantly present, between the heads of said steam-valve into either end of the steam-cylinder. When the valve retires to cut off the steam from one end of the cylinder, it simultaneously uncovers one of said exhaust-ports. In Fig. 1 the valve is in its extreme upper position and having closed the exhaust-port *m* at that end of the steam-cylinder is in position to admit steam to the latter through the port *j* to force down the piston on its next stroke. The parts being in this position, the said valve *i* will remain immovable until the piston head *c* has nearly completed its downstroke, when the valve is forced downward and passing by the steam-port *j* in the lower end of the cylinder will leave that open and will close the exhaust-port *m* in proximity thereto. The said downward movement of the piston-valve *i* is brought about as follows: On the head of the steam-cylinder *a* and axially in line with the steam-passage *e* is cast a boss *n*, and centrally over the cylinder is cast another boss *o*. The boss *n* is bored out from the top to receive a valve *p*, (shown in perspective in Fig. 4,) whose stem *q* projects through into the steam-passage *e* and rests on the top of the piston-valve *i* when the latter is moved up to the position shown in Fig. 1. The cap *r*, which closes this valve-chamber of the valve *p*, is of such dimensions as will provide a steam-chamber above said valve when the latter is in its extreme elevated position.

In the boss *o* is located the piston-valve *s*, which has a long stem *t* thereon, which projects down into a hole bored in the piston-rod *d*, as shown in Fig. 1. On the end of said stem is a head *u*. The nut *v*, which secures the piston-head *c* to its rod *d*, is provided with a keyhole-slot *w* therein, through which the head *u* of the valve-stem *t* is passed into the keyhole-slot, the said stem lying within the narrowest part of said slot. A steam-passage *x* leads from the steam-chamber *y* above said piston-valve *s* over to the chamber above the valve *p*, which when the piston-head *c* is in the position shown in Fig. 1 will cover the said passage *x*. A second passage *z* (shown in dotted lines in Figs. 1 and 2) extends from the steam-passage *e* to the chamber *y* and is also covered by said piston-valve *s* when the latter covers the passage *x*. When the piston-head *c* reaches that point on its down-stroke when the actuation of the piston-valve *i* becomes necessary to its continued movement in the opposite direction, the nut *v* reaches the head *u* on the stem of the valve *s*, and the latter being caught by the said narrowed end of the keyhole-slot *w* is drawn downward by the piston-head *c*. This downward movement opens the end of the steam-passage *z* in the chamber *y* and simultaneously opens the passage *x* from the latter to the chamber above the valve *p*, which is forced downward and carries with it the piston-valve *i*. The lower head *l* of said valve passes by the steam-port *j* in the lower end of said steam-passage *e* and closes thereby the exhaust-port *m* near it, and steam from the passage *d* thus reaches the under side of the piston-head *c* and forces it upward, the valves *i*, *s*, and *p* remaining stationary until the piston-head *c* nearly reaches the limit of its upward movement, when the nut *v* strikes a shoulder on the stem of the valve *s*, as seen in Fig. 1, which is thereby carried upward to the position shown in that figure, closing the steam-passages *x* and *z*. About the time these passages are closed a cavity 1 in the side of the piston-valve *s* arrives opposite the end of two exhaust-passages 2 and 3, thus establishing communication between them, whereby steam from the chamber of the valve *p* may pass through the passage 2 and thence through the said cavity 1 to the passage 3, through which it escapes into the exhaust-port *m* at the top of the cylinder *a*. As long as steam-pressure remains on the valve *p* the valve *i* is held down in its lowest position, for though the areas of the valve *p* and the head *k* of the valve *i* are substantially the same the effective pressure for raising the last-named valve only amounts to that represented by the difference in area between the heads *k* and *l* of the piston-valve *i*, against which the steam may act. As soon, however, as the steam-pressure is removed from the top of the valve *p* the valve *i* is forced upward by the pressure of steam in the passage *e* because of the greater area of the head *k*.

Referring to the valve *s*, it is essential that this valve should remain in the position in which it is left by the movement of the piston until the latter again actuates it; otherwise the piston stroke might be blocked by the premature movement of the valve *i*. For instance, assuming that when the piston-head *c* has reached a point half way through the cylinder, suppose the valve *s* should by reason of the vibration of the pump fall far enough to uncover the steam-passages *x* and *z*. Then the valve *i* would be actuated, as stated, by the valve *p* and reverse the movement of the piston-head *c*. It not infrequently happens that, as at present constructed, the valve may become so loose that the pump becomes practically inoperative, and when an effort is made to start it the piston-head will simply "flutter," each stroke being cut off soon after the beginning thereof. To obviate this defect, I construct the piston-valve *s*, as shown in the drawings, transversely expansible, whereby a certain amount of frictional resistance is created, which is sufficient to hold it in any given position in its chamber. This frictional resistance may be obtained in various ways; but I prefer to construct the valve, as shown in Figs. 1 and 5—viz., by dividing it practically into halves lengthwise, one of which has the stem *t* attached thereto, and then placing a spring 5 between said halves and forcing the piston into its chamber. The expansive action of the spring thus forces the loose half of the piston against the wall of the valve-chamber and provides thus the desired resistance against endwise movement thereof.

In practice it is preferable to make the loose half of the valve of somewhat less length than the other, thus having a cylindrical head and base, (indicated by 6 and 7, Fig. 5,) whereby the valve may be centered accurately in its chamber. There is provided a longitudinal groove 8 in the valve *s*, into which the point of a screw 9 enters through the wall of the valve-chamber—viz., the boss *o*. Another method of providing the desired frictional resistance for the valve *s* consists in making a cut 10 centrally down through the valve, as shown in Fig. 6. In this case, of course, the valve would be made a trifle large, whereby it would be necessary to spring the two parts together somewhat to enter the piston in its chamber. This construction, however, is not in all respects satisfactory, and that shown in Figs. 1 and 5 is preferred.

Having thus described my invention, what I claim, and desire to secure by Letters Patent of the United States, is—

1. In a pump of the class described, a controlling-valve of the piston type divided longitudinally into two parts, a valve-chamber, a spring between said two parts of the valve whereby they may be yieldingly and oppositely pressed against the wall of said chamber, combined with means for preventing the rotation of said valve substantially as described.

2. In a pump of the class described, a controlling-valve of the piston type divided longitudinally into two parts, a valve-chamber, steam inlet and outlet ports in the latter opposite one of said valve parts, a spring interposed between said parts to hold them yieldingly against the wall of the valve-chamber whereby more or less resistance against endwise movement may be applied to the valve, combined with means for preventing the rotation of the valve, substantially as described.

3. In a pump of the class described, a controlling-valve therefor of the piston type divided axially into two parts; a chamber for said valve, steam inlet and outlet ports on one side of said chamber, a spring between the two parts of the valve whereby one of the two parts of the latter may be yieldingly held against that part of the valve-chamber wherein said steam-ports are located, a screw whereby the other part of the valve may be adjusted to compress said spring, substantially as described.

4. In a pump of the class described, a controlling-valve of the piston type divided axially into two parts, a spring located between said parts whereby the valve may be yieldingly held to its seat, and whereby a frictional resistance may be applied thereto, a guide-slot in said valve parallel with the axis of the latter, and a pin engaging said slot, whereby the rotation of the valve is prevented, substantially as described.

5. In a pump of the class described, a controlling-valve of the piston type divided longitudinally into two parts, a valve-stem on one of said parts, a valve-chamber, a spring interposed between said parts of the valve to hold them yieldingly against the wall of the valve-chamber, steam inlet and outlet ports entering said chamber opposite that portion of the valve provided with a stem, means for moving said valve endwise and means of connection between the valve parts whereby they may move endwise as one piece, substantially as described.

6. The combination with a valve of the class described, of valve-actuating means exercising intermittent control only of said valve, expansive means between said valve and the wall of its chamber to control said valve during the periods of non-control by said actuating means and normally exposed means to adjust said expansive means.

7. The combination with a multipart valve of the class described of valve-actuating means exercising intermittent control only of said valve, means for separating parts thereof to control said valve during the periods of non-control by said actuating means and means in the valve-chamber to adjust said parts.

8. The combination with a valve of the class described, of valve-actuating means exercising intermittent control only of said valve, and means upon the valve itself and adjustable in normal position for preventing rotative movement thereof at all times and longitudinal movement of the same during the periods of non-control by said actuating means.

9. The combination with a valve of the class described, of valve-actuating means exercising intermittent control only of said valve, and means pressing the valve against its seat for preventing the movement of said valve during the periods of non-control by said actuating means, normally exposed means to control the pressure on said means.

In witness whereof I have hereunto set my hand.

JAMES H. BULLARD.

Witnesses:
WM. H. CHAPIN,
K. I. CLEMONS.